United States Patent [19]

Ohsawa et al.

[11] Patent Number: 5,220,498
[45] Date of Patent: Jun. 15, 1993

[54] POSITIONING DATA CORRECTION APPARATUS WITH IMAGE ANALYZING AND POSITIONING APPARATUS INCLUDING THE SAME

[75] Inventors: Hidetaka Ohsawa; Shun Suzuki; Masahiro Inaniwa, all of Katsuta, Japan

[73] Assignee: Hitachi Koki Company, Limited, Tokyo, Japan

[21] Appl. No.: 632,203

[22] Filed: Dec. 21, 1990

[30] Foreign Application Priority Data

Dec. 28, 1989 [JP] Japan ................................. 1-343161

[51] Int. Cl.$^5$ .......................................... G06F 15/46
[52] U.S. Cl. ......................... 364/167.01; 364/474.28; 364/474.35
[58] Field of Search ............ 364/167.01, 182, 474.28, 364/474.35; 395/93, 94; 382/9

[56] References Cited

U.S. PATENT DOCUMENTS

| | | | |
|---|---|---|---|
| 4,639,878 | 1/1987 | Day et al. | 364/474.35 |
| 4,707,647 | 11/1987 | Coldren et al. | 395/94 |
| 4,753,569 | 6/1988 | Pryor | 414/730 |
| 4,831,549 | 5/1989 | Red et al. | 364/167.01 |
| 4,891,767 | 1/1990 | Rzasa et al. | 395/94 |
| 5,084,827 | 1/1992 | Demesy et al. | 364/474.37 |

FOREIGN PATENT DOCUMENTS 61-270090 11/1986 Japan.

*Primary Examiner*—Jerry Smith
*Assistant Examiner*—Paul Gordon
*Attorney, Agent, or Firm*—Lowe, Price, LeBlanc & Becker

[57] ABSTRACT

A positioning data correction apparatus with image analyzing, for producing a corrective positioning command used in a positioning device for positioning a tool along an axis with respect to a target on a work in response to a command, comprises: a receiver for receiving the command and a mode signal; a camera connected to the tool for producing an image signal with respect to the axis in response to light from the work; an image analyzer responsive to a control signal and to the image signal for detecting a position of the target by analyzing a pattern along the axis and for producing corrected positioning data by obtaining deviation of the position along the axis from a given point within an angle of field of the camera; and a controller responsive to the mode signal, the received command, and the corrected positioning, the controller operating: sending the received command to the positioning device; and for producing the control signal to case the image analyzer to product the corrected positioning data and producing the corrective positioning command in accordance with the corrected data in the presence of the external control signal.

4 Claims, 6 Drawing Sheets

| INSTRUCTION STEP | CORRECTION FUNCTION USED | CORRECTION FUNCTION NOT USED |
|---|---|---|
| S1 | CORR EXE COM SIG=1 | CORR EXE COM SIG=0 |
| S2 | POSITION P1 | POSITION P1 |
| S3 | DRIVING SCREW | DRIVING SCREW |
| S4 | POSITION P2 | POSITION P2 |
| S5 | DRIVING SCREW | DRIVING SCREW |
| S6 | POSITION P3 | POSITION P3 |
| S7 | DRIVING SCREW | DRIVING SCREW |

POSITIONING DATA CORRECTION APPARATUS WITH IMAGE ANALYZING AND POSITIONING APPARATUS INCLUDING THE SAME

BACKGROUND OF THE INVENTION

1. Field of the Invention

This invention relates to a positioning data correction apparatus with image analyzing and positioning apparatus including the same.

2. Description of the Prior Art

A positioning data correction apparatus with image analyzing comprises a main controller for producing a positioning command signal in response to a manual operation command through an input circuit such as a keyboard, a positioning controller responsive to the positioning command signal for positioning a tool with respect to a hole in a work and the like, and a positioning data correction apparatus responsive to a video camera taking a picture of a target of the work, for producing a corrected data to send the data to the main controller in response to request from the main controller.

FIG. 5 is a block diagram of a prior art positioning apparatus including a positioning data correction apparatus with image analyzing. Operation of such positioning apparatus is as follows:

A positioning controller 3 receives a positioning command signal outputted from a main controller 2a. After the positioning controller 3 completes positioning, a positioning data correction apparatus 4a detects a position deviation of the hole 18 in a work 9 and sends it to the main controller 2a with image analyzing using a video signal from a video camera 10 connected to the screw-driving apparatus. The main controller 2a calculates a corrected positioning data from a present position and the position deviation of a hole 18 of the metal work 9, obtained by image analyzing and sends a corrected positioning command signal to the positioning controller 3. This positioning data correction technique by image-analyzing is disclosed in Japanese patent provisional publication No. 61-270090.

FIG. 6 shows interconnection between such a prior art positioning controller 3 and main controller 2a. The positioning controller 3 is operated in response to positioning command signals from the main controller 2a through a cable 6 with connectors 5. When the positioning controller 3 is used without the positioning data correction, the positioning controller 3 is coupled to the main controller by connecting with the cable 6. When the positioning controller 3 is used with the positioning data correction apparatus 4a of FIG. 5, the positioning data correction apparatus 4a is coupled to the main controller 2a by connection with the cable 6b with connectors 5 and 5a, as shown in FIG. 5. Therefore, the main controller 2a should have a program for using the positioning data correction apparatus 4a in addition to a program for controlling the positioning apparatus 3. Moreover, if the positioning data correction apparatus 4a is disconnected from the main controller 2a, additional operation is required for removing control for the positioning data correction apparatus 4a from the main controller 2a in addition to changing circuitry and cable wiring.

Therefore, there is a drawback when the positioning data correction apparatus 4a is added to the system of the main controller 2a and the positioning controller 3, in that a large degree of modification should be done for both hardware and software of the main controller 2a.

Moreover, in the prior art positioning apparatus, when a conventional positioning process without image-analyzing data correction is carried out, it is necessary to remove the image-analyzing positioning data correction function from the main controller 2a. That is, the positioning data correction apparatus 4a is disconnected from the main controller 2a and control function for the positioning data correction apparatus should be removed from the program of the main controller 2a. Thus, there is inconvenience because that process needs much manpower and time interval.

Further, generally, there is difficulty in use that many additional instructions are required compared with the case without positioning data correction with image analyzing in the prior art positioning apparatus.

SUMMARY OF THE INVENTION

The present invention has been developed in order to remove the above-described drawbacks inherent to the conventional positioning data correction apparatus with image analyzing and positioning apparatus including the same.

According to the present invention there is provided a positioning data correction apparatus with image analyzing, for producing a corrective positioning command signal used in a positioning apparatus for positioning a tool along an axis with respect to a target on a work in response to a positioning command signal and to the corrective positioning command signal, comprising: a receiver for receiving the positioning command signal and an external control signal; an image sensor camera associated with the tool for producing an image signal with respect to the axis in response to light from the work; an image analyzer responsive to a control signal and the image signal for detecting a position of the target by analyzing a pattern represented by the image signal along the axis and for producing corrected positioning data by obtaining deviation of the position along the axis from a given point within an angle of field of the image sensor camera; and a controller: responsive to the received positioning command signal for sending the received positioning command signal to the positioning apparatus; in the presence of the external control signal, responsive to the external control signal for producing the control signal to cause the image analyzer to produce the corrected positioning data; and in the presence of the external control signal, responsive to the corrected positioning data for producing and sending the corrective positioning command signal in accordance with the corrected data to the positioning apparatus.

According to the present invention there is also provided a positioning apparatus with image analyzing correction, comprising: a signal producing circuit responsive to manual operation for producing a positioning command signal and a first control signal; a positioning device: responsive to the positioning command signal for positioning a tool along an axis with respect to a target on a work; and responsive to a corrective positioning command signal for further positioning the tool; and a positioning data correction apparatus including: a receiver for receiving the positioning command signal and the first control signal; an image sensing camera associated with the tool for producing an image signal with respect to the axis in response to light from the work; an image analyzer responsive to a second control signal and the image signal for detecting a position of the target by analyzing a pattern represented by the image signal along the axis and for producing corrected positioning data by obtaining deviation of the position along the axis from a given point within an angle of field of the image sensor camera; and a controller: responsive to the received positioning command signal for sending the received positioning command signal to the positioning apparatus; and in the presence of the first control signal, responsive to the first control signal for producing the second control signal to cause the image analyzer to produce the corrected positioning data; and in the presence of the first control signal, responsive to the corrected positioning data for producing and sending the corrective positioning command signal in accordance with the corrected positioning data to the positioning device.

BRIEF DESCRIPTION OF THE DRAWINGS

The object and features of the present invention will become more readily apparent from the following detailed description taken in conjunction with the accompanying drawings in which.

The same or corresponding elements or parts are designated as like references throughout the drawings.

DETAILED DESCRIPTION OF THE INVENTION

Figure 1:
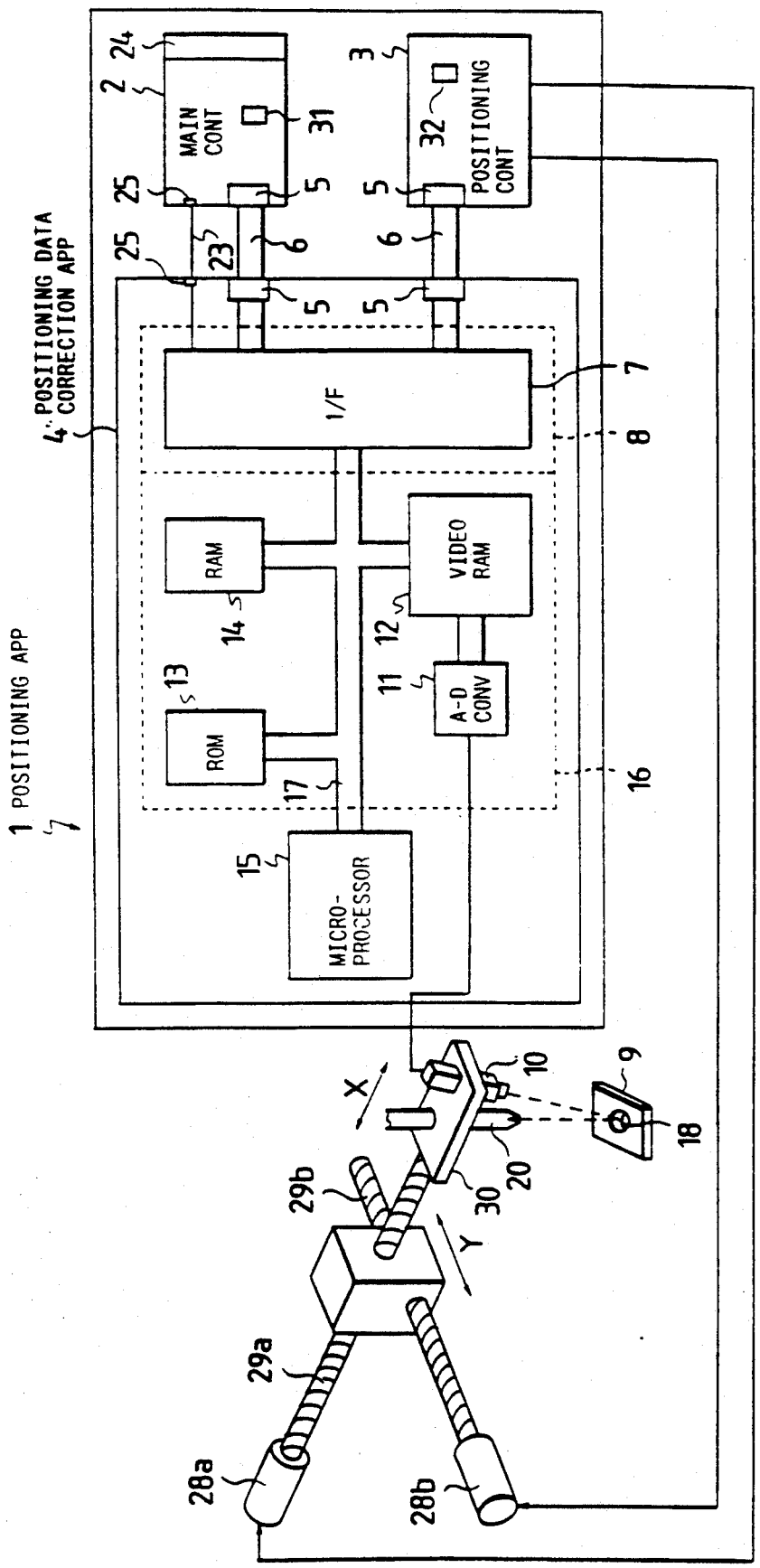
FIG. 1 is a block diagram of an embodiment of a positioning apparatus including positioning data correction apparatus for correcting positioning data through image analyzing.

Hereinbelow will be described an embodiment with reference to drawings. FIG. 1 is a block diagram of an embodiment of a positioning apparatus 1 including a positioning data correction apparatus 4 with image analyzing. The positioning apparatus 1 comprises a main controller 2 for producing a positioning command signal and a correction execution command signal; and a positioning data correction apparatus 4 for sending the position command signal from the main controller 2 to a positioning controller 3 and producing a corrected positioning command signal through image analyzing. The positioning controller 3 for positioning a base 30 with a tool of a screw-driving apparatus, whose bit 20 is shown, operates in response to the positioning command signal and the corrected positioning command signal.

The main controller 2 produces the positioning command signal and a correction execution command signal in response to a manual operation through a key board 24. The positioning data correction apparatus 4 sends the position command signal to the positioning controller 3. The positioning command signal from the main controller 2 via the positioning data correction apparatus 4 is used for positioning the tool by predetermined data, at first. On the other hand, a corrected positioning command produced by the positioning correction apparatus 4 is used for correctively positioning after the coarse positioning. The positioning controller 3 positions a screw-driving apparatus with respect to a hole 18 of the metal work 9 in response to the positioning command and corrected positioning command signal from the positioning data correction apparatus 4 by driving lead screws 29a and 29b arranged along X and Y axes by motors 28a and 28b respectively.

The positioning data correction apparatus 4 produces a positioning command signal including corrected positioning data in response to the correction execution command from the main controller 2 though a cable 23 and in response to light from the work 9 and around it after the positioning by the positioning connectors 3 on the basis of the positioning command received from the main controller 2.

The main controller 2 is connected to the positioning data correction apparatus 4 through a cable 6 via connecters 5 for transmitting the position command and the correction execution command signal and the like. Therefore, these elements can be disconnected, as desired.

The positioning data correction apparatus 4 comprises: an A-D converter 11 for converting an analog video signal from the image sensor camera 10 into a digital signal; a video RAM 12 for storing the digital video signal from the A-D converter 11; a microprocessor 15 for performing control for the same and image analyzing using the digital video signal from the video memory 12 in response to the positioning execution command in accordance with a program stored in a ROM 13; and a RAM 14 for storing the positioning command signal, the correction data, the present position data and the like; and an interface section 8 having communication interface 7 for communicating with the main controller 2 and the positioning controller.

The image sensor camera 10 is provided to the base 30 positioned by the lead screws 29a and 29b, on which the bit 20 of the screw-driving apparatus is mounted. The image sensor camera 10 produces the analog video signal in response to light from the hole 18 in the metal plate work 9 and around it with a oblique angle with the axis of the bit 20 to detect position deviation of the bit 20 from the hole 18.

More specifically, the main controller 2 sends a position command to the positioning data correction apparatus 4. The positioning data correction apparatus 4 receives the positioning command signal and sends it to the positioning controller 3. The position controller 3 performs poisoning with predetermined data after reception of the positioning command from the positioning data correction apparatus 4. The positioning data correction apparatus detects a position deviation of the hole 18 in the work 9 from the position of the bit by using the video signal from the image sensing camera 10. The positioning data correction apparatus 4 produces a corrected positioning command signal and sends it to the positioning controller 3 for accurate positioning.

The positioning controller 3 controls driving of the motors 28a and 28b to position the base 30 where the bit 20 and the image sensing camera are provided in response to the positioning command.

Figure 2A:
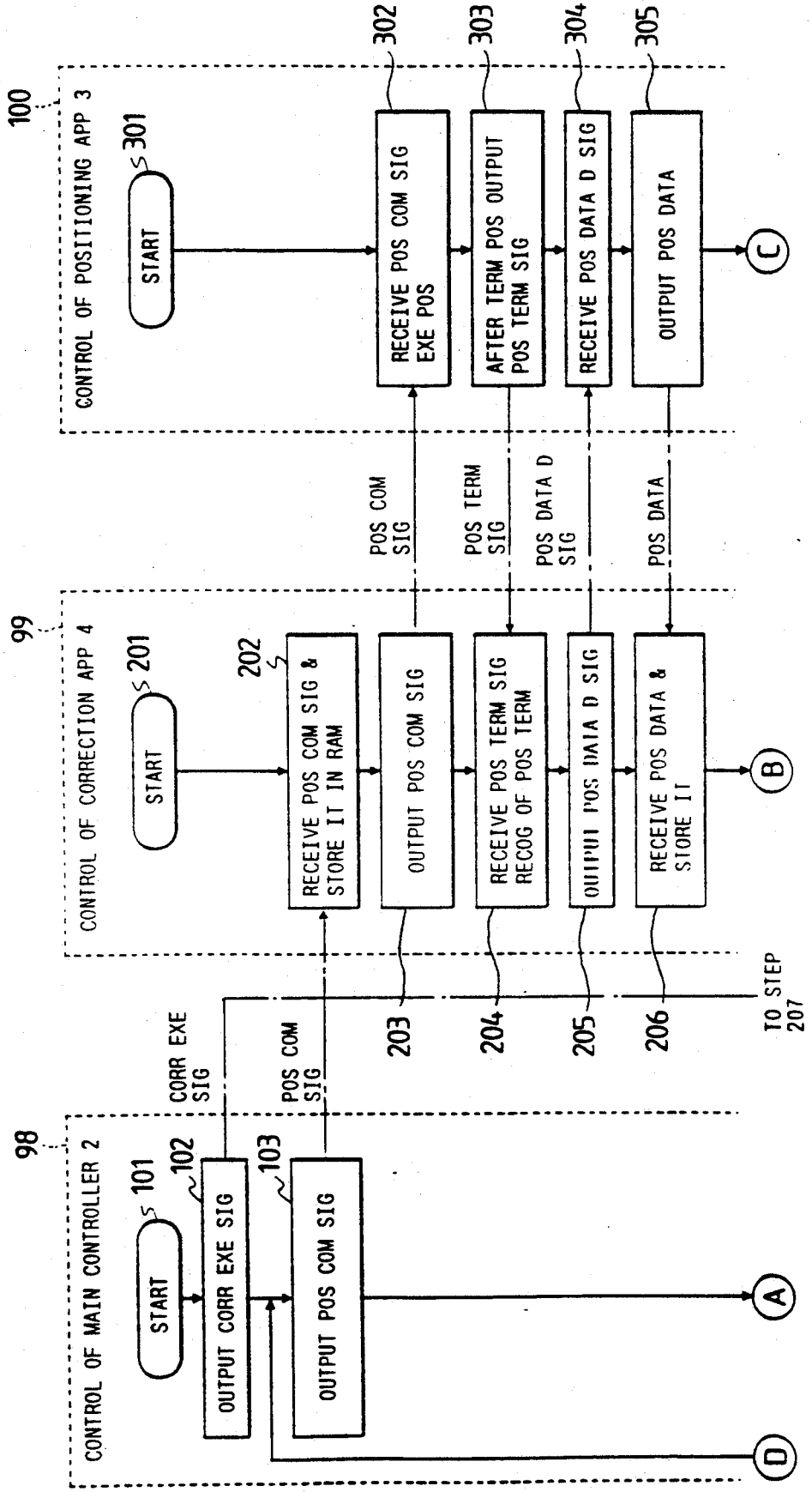
FIGS. 2A and 2B show a flow chart of operation of the positioning apparatus of the invention.
Figure 2B:
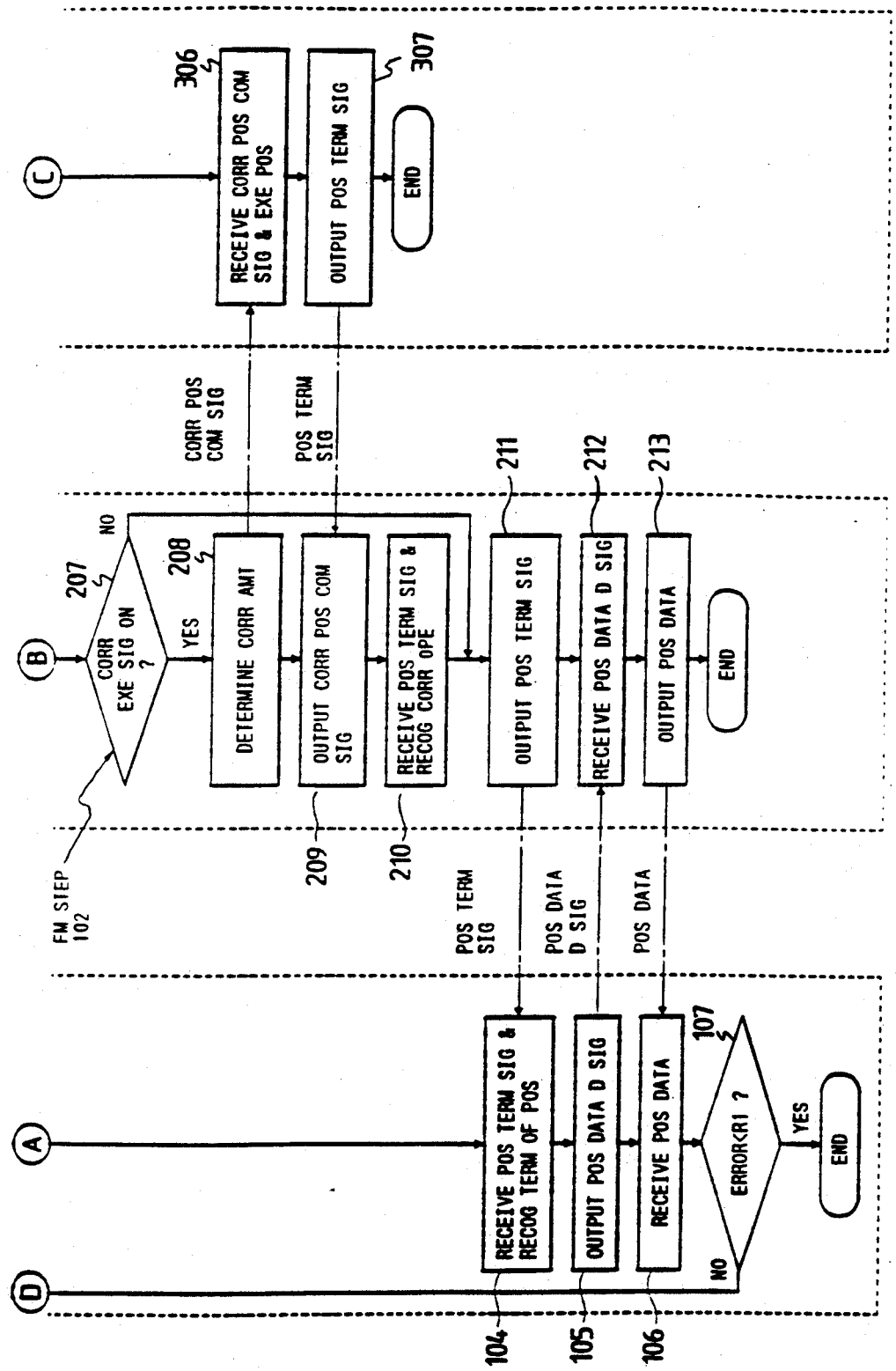

Hereinbelow will be described operation of the positioning apparatus of the invention with reference to FIGS. 2A and 2B. FIGS. 2A and 2B show a flow chart of operation of the positioning apparatus 1 of the invention. A microprocessor 31 of the main controller 2 executes a program shown by a flow 98. The microprocessor 15 of the positioning data correction apparatus 4 executes a program shown by a flow 99. A microprocessor 32 of the positioning apparatus executes a program shown by a flow 100.

The keyboard 24, as instruction input means, sends a positioning instruction, an instruction for driving a screw, and an instruction indicative of use or not use of a positioning-data correction function. Then, it sends a positioning command signal and correction execution signal. An instruction for executing the positioning data correction function is added to the prior art positioning controller. It is indicated by the correction execution signal CORR EXE SIG, which is 1 when the correction function is used, or 0 when the correction function is not used. The microprocessor 31 of the main controller 2 receives these instruction and executes processing at step 102. In step 102, the microprocessor 31 outputs a correction execution signal which will be used in step 207 of the control 99 of positioning data correction apparatus 4. The main controller 2 maintains to output the correction execution signal CORR EXE SIG, which is set to "1", to the correction apparatus 4 before execution of positioning with image analyzing correction. In the following step 103, the microprocessor 31 outputs a positioning command signal including positioning data. The microprocessor 15 of the positioning data correction apparatus 4 starts processing at step 201. In the following step 202, the positioning data correction apparatus 4 receives the positioning command signal from the main controller 2 for positioning the bit 20 of a screw-driving apparatus above the hole 18 of the metal plate work 9 and it stores the positioning command signal into the RAM 14. The positioning data correction apparatus 4 sends the positioning command stored in the RAM 14 to the positioning controller 3 in step 203. The microprocessor 32 starting processing in step 301 receives the position command signal and executes the positioning operation in step 302. The positioning controller 3 outputs a positioning termination signal to the positioning data correction apparatus 4 in step 303 after termination of positioning in step 204. The microprocessor 15 recognizes termination of positioning. Then, the positioning data correction apparatus 4 sends a present position data demand signal to the positioning controller 3 in step 205. In the following step 206, the microprocessor 15 obtains a present position data from the positioning apparatus 3 to store it into the RAM 14. In step 207, the positioning data correction apparatus 4 detects the correction execution signal made in step 102 and a decision is made as to whether the correction execution signal is "1" or "0". If the correction execution instruction signal is of "1", it executes processing of image analyzing correction operation in step 208.

In step 208, the positioning data correction apparatus 4 starts to read out a video signal outputted from the image sensor camera 10 taking a picture of the hole 18 of the metal plate work 9 and its peripheral portion. The positioning data correction apparatus 4 stores the video data into the video RAM 12 through an A-D converter 11 and calculate an amount of deviation of the hole 18 using data of the detected center position of the hole 18. It calculates a corrected positioning data from the present position data stored in the RAM 14 and the calculated the amount of deviation of the hole position to produce another corrected positioning command signal to the positioning controller 3.

More specifically, the microprocessor 15 detects a position of the hole 18 as a target by analyzing highlight and shadow patterns along the X axis and produces corrected positioning data by obtaining deviation of the position along X axis from a given point within an angle of field of the image sensor camera 10. Moreover, the hole 18 is a round hole made by drilling. Thus, the microprocessor 15 can obtain the center position of the hole 18 by calculating an arithmetic mean of lengths along X axis from a given point within the angle of the field of the image sensor camera to one and another ends of the shadow pattern.

On the other hand, the positioning controller 3 receives the corrected positioning command for correction and executes positioning operation again in step 306. In the following step, it sends the positioning termination signal POS TERM SIG to the positioning data correction apparatus 4.

The positioning data correction apparatus 4 recognizes termination of the positioning by reception of the positioning termination signal in step 210. In the following step 211, it sends the positioning termination signal to the main controller 2.

The main controller 2 recognizes termination of positioning by reception of the positioning termination signal in step 104. In the following step 105, it sends a present position data demand signal POS DATA D SIG to the positioning data correction apparatus 4.

The positioning data correction apparatus 4 sends the present data before correction to the main control section 2 in step 213.

In step 106, the main controller 2 receives the present data. In the following step 107, it determines that a normal positioning is carried out in accordance with the positioning command. In other words, it determine whether position error is less than a given level. If it is not normal, the main controller 2 executes positioning again until a normal positioning is carried out. That is, processing returns to the step 103. Positioning with image analyzing correction is finished by completion of the above-mentioned sequential operation. Then, the main controller 2 starts to carry out an operation of driving a screw, i.e., driving bit 20, and the like in the next step.

Corrective positioning responsive to corrected positioning data is started after termination of positioning in step 302. However, there are many variations considered. For example, the corrective positioning may carried out after a given period after sending positioning command signal in step 203. Alternatively, the positioning data correction apparatus produces the corrected positioning command periodically and the positioning controller 3 receives the corrected positioning command at termination of the coarse positioning.

Figures 3, 4:
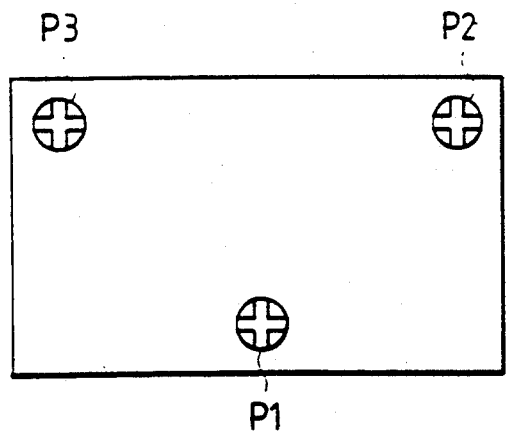
FIG. 3 is a table showing a sample of instruction data for the operation of driving a screw.
FIG. 4 is a plan view of a work where driving screw operation is carried out.
Figure 5:
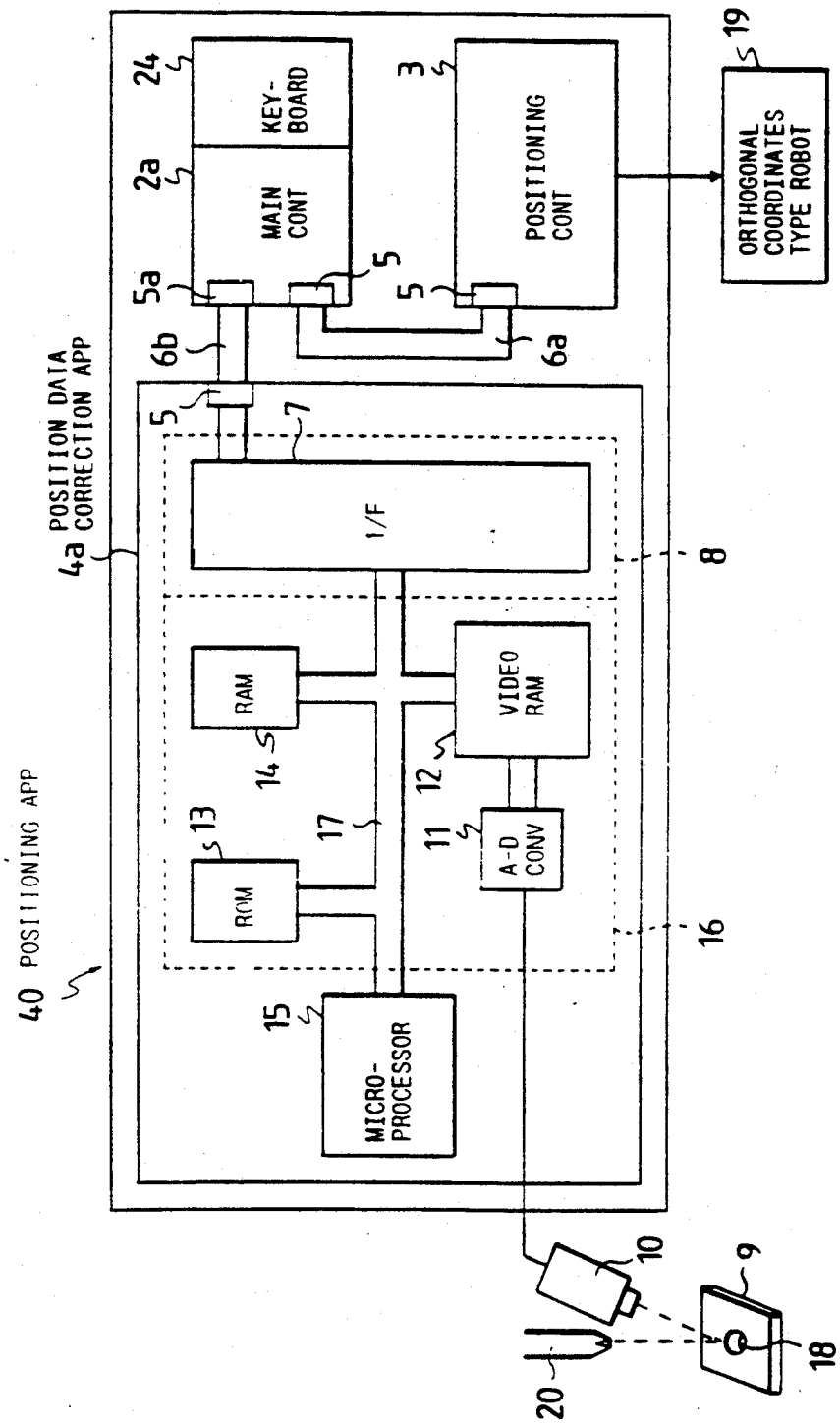
FIG. 5 is a block diagram of a prior art positioning apparatus including positioning data correction apparatus with image analyzing.
Figure 6:
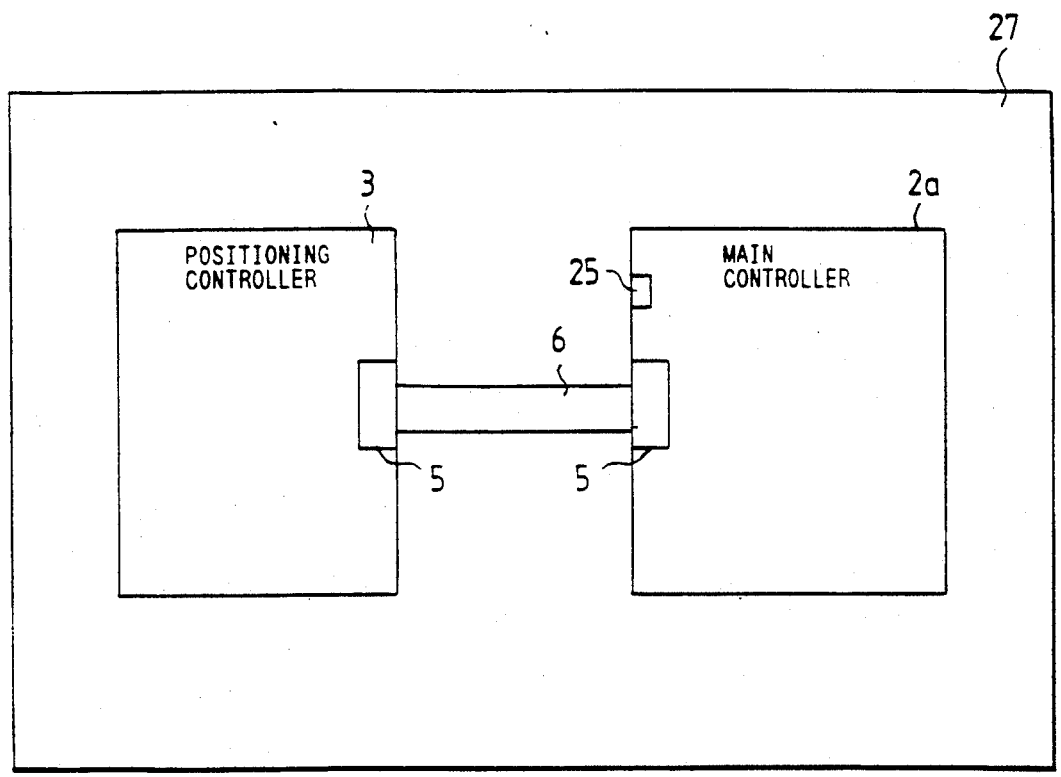
FIG. 6 shows interconnection between a positioning controller and main controller of the prior art.

If image analyzing correction function is not used, a correction execution command signal "0" is made in the instruction process. The positioning data correction apparatus 4 receives the correction execution command signal indicative of "0" outputted from the main controller 2. The positioning data correction apparatus 4 recognizes, thereby, that correction function is not used for positioning. Then, it performs only a function for relaying a positioning command, present position data and the like. Thus, a normal operation of driving a screw can be performed by the additional instruction 1 step readily. For example, a sample of instruction data for the operation of driving a screw at three points is shown in FIG. 3. In FIG. 3, at first, correction execution command signal is set by the key board 24 in instruction step S1 which is only added step to the conventional instruction processing. Steps S2 to S7 are conventional instruction steps where positioning and driving screw operations are done alternatively. FIG. 4 is a plan view of a work where driving screw operation is done at positions P1 to P3.

What is claimed is:

1. Positioning data correction apparatus with image analyzing, for producing a corrective positioning command signal used in a positioning apparatus for positioning a tool along an axis with respect to a target on a work in response to a positioning command signal and to said corrective positioning command signal, comprising:
   (a) receiving means for receiving said positioning command signal and an external control signal;
   (b) image sensing means associated with said tool for producing an image signal with respect to said axis in response to light from said work;
   (c) image analyzing means responsive to a control signal and to said image signal for detecting a position of said target by analyzing a pattern represented by said image signal along said axis and for producing corrected positioning data by obtaining deviation of said position along said axis from a given point within an angle of field of said image sensing means; and
   (d) control means;
      responsive to said received positioning command signal for sending said received positioning command signal to said positioning apparatus;
      said control means responsive to said external control signal for producing said control signal to cause said image analyzing means to produce said corrected positioning data; and
      said control means responsive to said corrected positioning data when said external control signal is present for producing and sending said corrective positioning command signal in accordance with said corrected data to said positioning apparatus.

2. Positioning data correction apparatus as claimed in claim 1, wherein said receiving means receives a completion signal of positioning from said positioning apparatus and sends it to said control means, said control means producing said control signal and producing said corrective positioning command signal in response to said received completion signal.

3. Positioning data correction apparatus as claimed in claim 1, wherein said target is a round hole and said image analyzing means obtains said position by detecting highlight and shadow patterns and by calculating an arithmetic mean of lengths along said axis from said given point to one and another ends of said shadow pattern.

4. Positioning apparatus with image analyzing correction, comprising:
   (a) signal producing means responsive to manual operation for producing a positioning command signal and a first control signal;
   (b) positioning means:
      responsive to said positioning command signal for positioning a tool along an axis with respect to a target on a work
      responsive to a corrective positioning command signal for further positioning said tool; and
   (c) positioning data correction apparatus including:
      (I) receiving means for receiving said positioning command signal and said first control signal;
      (II) image sensing means associated with said tool for producing an image signal with respect to said axis in response to light from said work;
      (III) image analyzing means responsive to a second control signal and said image signal for detecting a position of said target by analyzing a pattern represented by said image signal along said axis and for producing corrected positioning data by obtaining deviation of said position along said axis from a given point within an angle of field of said image sensing means; and
      (IV) control means:
         responsive to said received positioning command signal for sending said received positioning command signal to said positioning apparatus; and
         said control means responsive to said first control signal for producing said second control signal to cause said image analyzing means to produce said corrected positioning data; and
         said control means responsive to said corrected positioning data when said external control signal is present for producing and sending said corrective positioning command signal in accordance with said corrected positioning data to said positioning apparatus.

* * * * *